(12) United States Patent
White et al.

(10) Patent No.: US 8,035,750 B1
(45) Date of Patent: *Oct. 11, 2011

(54) 3:2 PULLDOWN DETECTION

(75) Inventors: Jonathan B. White, Fort Collins, CO (US); Michael L. Lightstone, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/949,003

(22) Filed: Nov. 30, 2007

Related U.S. Application Data

(62) Division of application No. 10/417,018, filed on Apr. 16, 2003.

(51) Int. Cl.
*H04N 9/64* (2006.01)
*H04N 5/14* (2006.01)

(52) U.S. Cl. ......... 348/700; 348/441; 348/449; 348/558

(58) Field of Classification Search .................. 348/558, 348/447–452, 441, 700–702, 459, 97, 911, 348/722, 526, 192–193, 184; *H04N 9/64, H04N 5/14*
See application file for complete search history.

(56) References Cited

U.S. PATENT DOCUMENTS

| | | | |
|---|---|---|---|
| 4,982,280 A | 1/1991 | Lyon et al. | |
| 5,461,420 A | 10/1995 | Yonemitsu et al. | |
| 5,852,473 A | 12/1998 | Horne et al. | |
| 6,014,182 A | 1/2000 | Swartz | |
| 6,784,921 B2 | 8/2004 | Lim, II | |
| 6,891,571 B2 | 5/2005 | Shin et al. | |
| 6,906,743 B1 | 6/2005 | Maurer | |
| 7,015,909 B1 * | 3/2006 | Morgan, III et al. | 345/426 |
| 7,142,246 B2 | 11/2006 | Chen et al. | |
| 7,283,174 B2 | 10/2007 | Tokuhara et al. | |
| 2004/0119887 A1 | 6/2004 | Franzen | |
| 2004/0189651 A1 | 9/2004 | Zatz et al. | |
| 2008/0094506 A1 | 4/2008 | MacInnis et al. | |

FOREIGN PATENT DOCUMENTS

WO    WO 02/089477    11/2002

OTHER PUBLICATIONS

Office Action in U.S. Appl. No. 10/417,018 mailed on Apr. 8, 2009.
Office Action, U.S. Appl. No. 11/949,001, dated May 28, 2009.
Ramer, Dan. "What the Heck is 3:2 Pulldown," Feb. 3, 2003, available at http://www.dvdfile.com/lnews/special_report/production_a_z/3_2_pulldown.html.
Office Action, U.S. Appl. No. 11/949,001, dated Apr. 14, 2010.
Office Action, U.S. Appl. No. 11/948,991, dated Nov. 23, 2011.
Office Action, U.S. Appl. No. 11/948,996, dated Nov. 26, 2011.

* cited by examiner

*Primary Examiner* — Trang U Tran

(74) *Attorney, Agent, or Firm* — Patterson & Sheridan, L.L.P.

(57) ABSTRACT

Field-based detection of 3:2 pulldown in a sequence of digital video fields using a programmable graphics processor is described. The detection is performed using a threshold value to determine equivalence between a pair of fields of digital video data. Furthermore, additional threshold values may be used to control switching into a mode where duplicated fields of digital video data are identified and not displayed and out of the mode where duplicated fields of digital video data are identified and not displayed. Look ahead can be used to detect when to switch into or out of the mode where duplicated fields of digital video data are identified and not displayed, reducing the occurrence of visual artifacts.

14 Claims, 10 Drawing Sheets

CONCEPTUAL DIAGRAM

3:2 PULLDOWN DETECTION

CROSS-REFERENCE TO RELATED APPLICATIONS

This application is a divisional of U.S. patent application Ser. No. 10/417,018, filed Apr. 16, 2003.

BACKGROUND

Current graphics data processing includes systems and methods developed to perform a specific operation on graphics data, e.g., linear interpolation, tessellation, rasterization, texture mapping, depth testing, and the like. Traditionally graphics processors include several fixed function computation units to do such specific operations, and more recently, the computation units have a degree of programmability to perform user specified operations.

While computation units included in each graphics processor can vary, a common element is a sampling unit that processes graphics primitives and generates sub-primitive data, such as pixels or fragments. Graphics primitives include geometry, such as points, lines, triangles, quadrilaterals, meshes, and the like. A graphics processor uses a sampling unit and computation units to convert graphics primitives into sub-primitive data and generate image data.

Graphics processors use memory to store graphics data and program instructions, where graphics data is any data that is input to or output from the computation units within the graphics processor. Graphics memory is any memory used to store graphics data or program instructions to be executed by the graphics processor. Graphics memory can include portions of system memory, local memory directly coupled to the graphics processor, register files coupled to the computation units within the graphics processor, and the like.

The computation units within some graphics processors are coupled to each other to form a graphics pipeline such that the output of a first computation unit is coupled to the input of a second computation unit to form a node. Computation units are coupled in sequence to form additional nodes. Additional computational units can be connected between two nodes to form parallel computational units. Within the graphics pipeline processing can proceed simultaneously within each of the computational units.

Recently, graphics processors can be programmed using shader programs and vertex programs, permitting a wider variety of functions to be performed using these programmable graphics processors. Consequently functions that traditionally required dedicated fixed function hardware, such as video processing functions, can be performed using programmable graphics processors.

During the transfer of film to video each film frame is decomposed into an odd field including odd horizontal scan lines from a film frame and an even field including even horizontal scan lines from the film frame for display on an interlaced display such as an NTSC video display. An odd or even field is replicated every other film frame during 3:2 pulldown to compensate for the greater number of frames displayed per second during video playback. When film content is transferred using 3:2 pulldown, information indicating 3:2 pulldown was used may be encoded with the data. This information may be used by later progressive video decoding hardware to remove the replicated odd or even fields. Removal of the replicated fields reduces artifacts resulting from displaying temporally asynchronous fields synchronously. However, for some content, e.g., "extras" such as cut scenes, interviews, music videos, and the like, the pulldown information is not encoded or may not be accurate and visual artifacts can be introduced by improperly removing fields or by not removing replicated fields prior to display.

Accordingly, it is desirable to accurately detect the presence of 3:2 pulldown independent of the pulldown encoded information and to selectively determine which fields to display for each frame of progressive video. Furthermore, when possible it is desirable to use a programmable graphics processor, to perform the functions traditionally performed using dedicated fixed function hardware.

SUMMARY

A method for detecting 3:2 pulldown in a digital video data sequence measures a difference between a subsequent pair of digital video data fields, to produce a field difference. The subsequent pair of digital video data fields includes an nth digital video data field in the digital video data sequence and an (n−2)th digital video data field in the digital video data sequence. The field difference is compared to a field match threshold value to produce a field match result.

Another method for detecting 3:2 pulldown in a digital video data sequence measures a difference between portions of subsequent pairs of digital video data fields, to produce a field portion difference. The measurement is repeated to produce additional field portion differences.

Another method for detecting pulldown in a digital video data sequence filters a portion of a field of digital video data and filters a corresponding portion of a subsequent field of digital video data. A field portion difference between the filtered portion of the field of digital video data and the filtered corresponding portion of the subsequent field of digital video data is measured to produce a field portion difference. The filtering and measurement is repeated to produce additional field portion differences.

Another method for detecting 3:2 pulldown in a digital video data sequence measures differences between five sequential pairs of fields of digital video data to produce five field differences. Each of the five field differences is compared to a field match threshold value to produce a matched field count and a field compare count. Detection of 3:2 pulldown is indicated when the field compare count is five and the matched field count is one. Detection of 3:2 pulldown is not indicated when the field compare count is five and the matched field count is not one.

Another method for detecting a 3:2 pulldown pattern in a digital video data sequence measures differences between five sequential pairs of fields of digital video data in the digital video data sequence to produce a matched field count and a field compare count. A pulldown match count is updated when the field compare count is five and the matched field count is one. A pulldown non-match count is updated when the field compare count is five and the matched field count is not one. The pulldown match count is compared to a matched field count threshold value and the pulldown non-match count is compared to a non-matched field count threshold value to produce a pulldown result.

A method for using look ahead to detect 3:2 pulldown in a digital video data sequence to reduce visual artifacts during display stores five sequential pairs of fields of digital video data in the digital video data sequence in a graphics memory as texture map data. The five sequential pairs of fields of digital video data in the digital video data sequence are read from the graphics memory. Differences between the five sequential pairs of fields of digital video data in the digital video data sequence are measured to produce a pulldown result. The five sequential pairs of fields of digital video data in the digital video data sequence are selectively displayed at least partially responsive to the pulldown result.

A graphical user interface for 3:2 pulldown detection includes a graphical element for a user to select, enter or adjust a match field threshold value for use by a programmable graphics processor configured to perform 3:2 pulldown detection in a digital video data sequence.

A graphical user interface for 3:2 pulldown detection includes a graphical element for a user to select, enter or adjust a matched field count threshold value for use by a programmable graphics processor configured to perform 3:2 pulldown detection in a digital video data sequence.

A graphical user interface for 3:2 pulldown detection includes a graphical element for a user to select, enter or adjust a non-matched field count threshold value for use by a programmable graphics processor configured to perform 3:2 pulldown detection in a digital video data sequence.

An application programming interface for a programmable graphics processor includes a function call to configure the programmable graphics processor to use at least one threshold value for detecting 3:2 pulldown in a digital video data sequence.

A programmable graphics processor configured to detect 3:2 pulldown in a sequence of digital video fields includes a read interface configured to read the sequence of digital video fields from a graphics memory and a fragment shader configured to detect 3:2 pulldown in the sequence of digital video fields under control of shader program instructions.

A computing system includes a host processor, a host memory, the host memory storing programs for the host processor, a system interface configured to interface with the host processor, a video unit configured to provide digital video data to the system interface and a programmable graphics processor. The programmable graphics processor includes a read interface configured to read the digital video data from a graphics memory and a fragment shader configured to detect 3:2 pulldown in the digital video data under control of shader program instructions.

Another computing system includes a host processor, a host memory, the host memory storing programs for the host processor, a system interface configured to interface with the host processor and a programmable graphics processor. The programmable graphics processor includes a video unit configured to provide digital video data to a fragment shader. The fragment shader is configured to detect 3:2 pulldown in the digital video data under control of shader program instructions.

BRIEF DESCRIPTION OF THE DRAWINGS

Accompanying drawing(s) show exemplary embodiment (s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
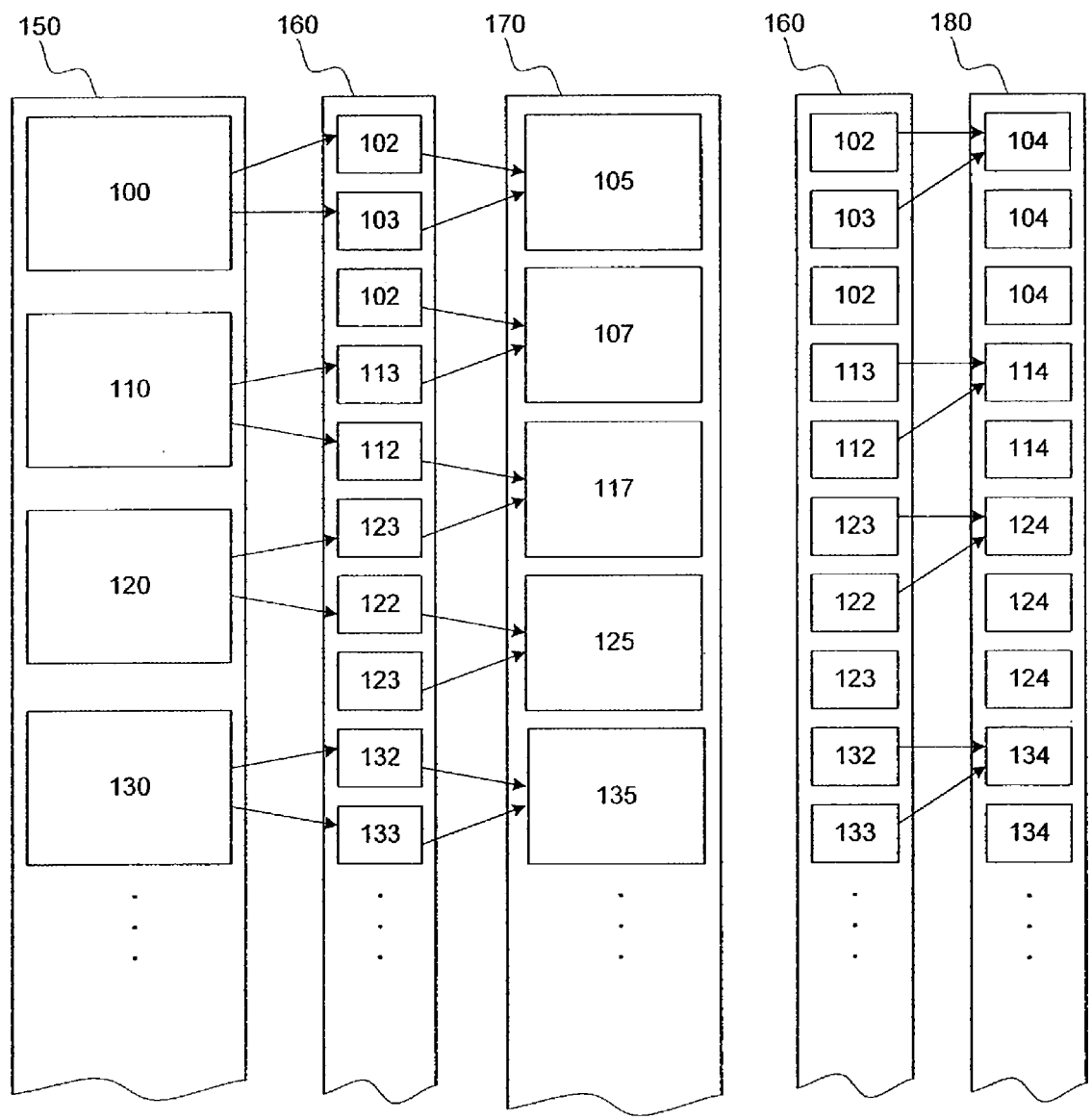
FIG. 1 is a conceptual diagram of film to video field conversion, video field to interlaced video conversion and video field to progressive video conversion.

FIG. 1 is a conceptual diagram displaying the process of transferring film frames to video frames for non-interlaced, i.e., progressive, display. A Portion of Film Sequence 150 includes a Frame 100, a Frame 110, a Frame 120 and a Frame 130, each composed of two fields. An odd field includes the odd horizontal scan lines and an even field includes the even horizontal scan lines. A Portion of Pulldown Sequence 160 includes the fields generated during 3:2 pulldown of Portion of Film Sequence 150. A Field 102 is the even field of Frame 100 and a Field 103 is the odd field of Frame 100. During 3:2 pulldown Field 102 is duplicated, so it precedes and follows Field 103 in Portion of Pulldown Sequence 160.

Likewise, a Field 113 is the odd field of Frame 110 and a Field 112 is the even field of Frame 110. A Field 123 is the odd field of Frame 120 and a Field 122 is the even field of Frame 120. During 3:2 pulldown Field 123 is duplicated, so it precedes and follows Field 122 in Portion of Pulldown Sequence 160. A pattern in Portion of Pulldown Sequence 160 started with Frame 102 is completed with the even field of Frame 130, a Field 132 and the odd field of Frame 130, a Field 133.

A Portion of Film Content Sequence 170 is constructed using Portion of Pulldown Sequence 160. Fields 102 and 103 are displayed as a Frame 105. Fields 102 and 113 are displayed as a Frame 107. Fields 112 and 123 are displayed as a Frame 117. Fields 122 and 123 are displayed as a Frame 125. Fields 132 and 133 are displayed as a Frame 135. When fields from different frames in Portion of Film Sequence 150 are displayed in a frame in Portion of Film Content Sequence 170 visual artifacts can be introduced. For example, Frame 107 is displayed using even Field 102 from Frame 100 and odd Field 113 from Frame 110. Fields 102 and 113 were not acquired synchronously and spacial visual artifacts such as combing, feathering, smearing, and the like can be introduced for portions of Frame 100 that differ from portions of Frame 110.

A Portion of Film Content Sequence 180 is also constructed using Portion of Pulldown Sequence 160. Unlike Portion of Film Content Sequence 180, Portion of Film Content Sequence 180 only includes frames displayed using fields captured synchronously. Fields 102 and 103 are displayed as a Frame 104 and the duplicated Field 102 is discarded. The construction of Non-Interlaced Video Sequence 180 is more complex than the construction of Portion of Film Content Sequence 180 because fields in Portion of Pulldown Sequence 160 are selectively discarded. Fields 112 and 113 are displayed as a Frame 114. Fields 122 and 123 are displayed as a Frame 124 and the duplicated Field 123 is discarded. To achieve a desired number of frames per second, constructed Frames 104, 114, 124 and others are replicated during the construction of Non-Interlaced Video Sequence 180. A programmable graphics processor can be used to construct Non-Interlaced Video Sequence 180, as described further herein.

Figure 2A:
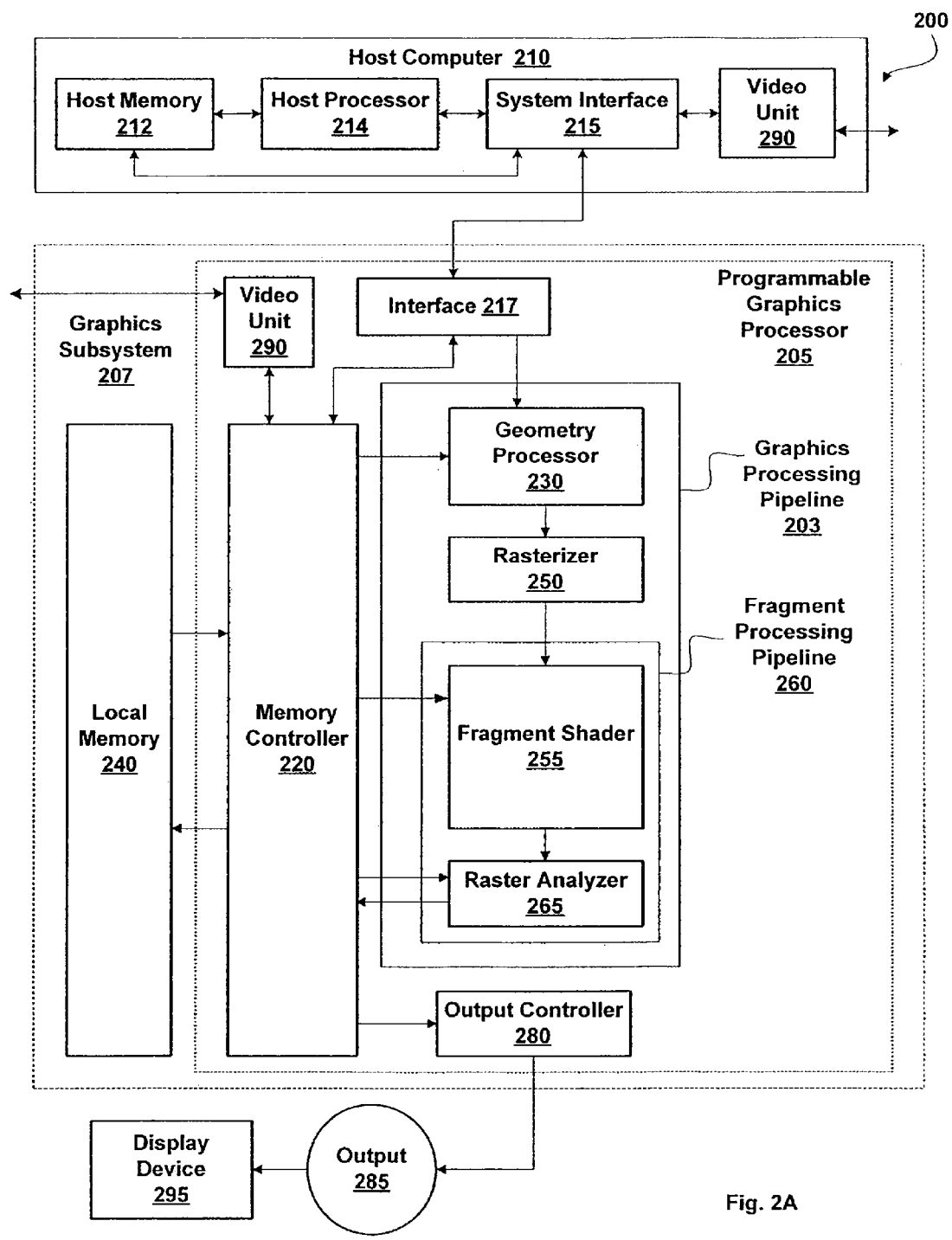
FIG. 2A is a block diagram of an exemplary embodiment of a respective computer system in accordance with one or more aspects of the present invention.

FIG. 2A is a block diagram of an exemplary embodiment of a Computing System generally designated 200 and including a Host Computer 210 and a Graphics Subsystem 207. Computing System 200 may be a desktop computer, server, laptop computer, palm-sized computer, tablet computer, game console, cellular telephone, computer based simulator, or the like. Host computer 210 includes Host Processor 214 that may include a system memory controller to interface directly to Host Memory 212 or may communicate with Host Memory 212 through a System Interface 215. System Interface 215 may be an I/O (input/output) interface or a bridge device including the system memory controller to interface directly to Host Memory 212. Examples of System Interface 215 known in the art include Intel® Northbridge and Intel® Southbridge. A Video Unit 290 within Host Computer 210 can receive encoded video data and decode the video data to provide a digital video data sequence containing fields of digital video data to System Interface 215. In an alternate embodiment, Video Unit 290 can receive encoded video data and provide the encoded video data to Host Processor 214 via System Interface 215 for decoding. In a further embodiment, Video Unit 290 is included in Graphics Subsystem 207 and is coupled to a Fragment Shader 255, to be described further herein, through a Memory Controller 220.

Host computer 210 communicates with Graphics Subsystem 207 via System Interface 215 and an Interface 217. Graphics Subsystem 207 includes a Local Memory 240 and a Programmable Graphics Processor 205. In addition to Interface 217, Programmable Graphics Processor 205 includes a Graphics Processing Pipeline 203, Memory Controller 220 and an Output Controller 280. Data received at Interface 217 can be passed to a Geometry Processor 230 within Graphics Processing Pipeline 203 or written to Local Memory 240 through Memory Controller 220. In addition to communicating with Local Memory 240 and Interface 217, Memory Controller 220 also communicates with Graphics Processing Pipeline 203 and Output Controller 280 through read and write interfaces in Graphics Processing Pipeline 203 and a read interface in Output Controller 280. The read and write interfaces generate address and control signals to Memory Controller 220.

Within Graphics Processing Pipeline 205, graphics processing units Geometry Processor 230 and a Fragment Processing Pipeline 260, each contain at least one programmable computation unit (PCU) to perform a variety of computational functions. Some of these functions are table lookup, scalar addition, vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple passes through Graphics Processing Pipeline 203 or in multiple passes through Fragment Processing Pipeline 260. Each pass through Programmable Graphics Processor 205, Graphics Processing Pipeline 203 or Fragment Processing Pipeline 260 concludes with optional processing by a Raster Analyzer 265.

Geometry Processor 230 receives a stream of program instructions and data and performs vector floating-point operations or other processing operations to produce processed data. The program instructions and data are stored in graphics memory, e.g., portions of Host Memory 212, Local Memory 240 or storage resources within Programmable Graphics Processor 205. Storage resources can include register files, caches, FIFOs (first in first out), and the like. When a portion of Host Memory 212 is used to store program instructions and data the portion of Host Memory 212 can be uncached so as to increase performance of access by Programmable Graphics Processor 205. The processed data is passed from Geometry Processor 230 to a Rasterizer 250. In a typical embodiment Rasterizer 250 performs scan conversion and outputs fragment, pixel, or sample data and program instructions to Fragment Processing Pipeline 260. Therefore Fragment Processing Pipeline 260 is typically programmed to operate on fragment, pixel or sample data. For simplicity, the remainder of this description will use the term fragments to refer to pixels, samples and fragments.

Fragment Processing Pipeline 260 is programmed to process fragments using shader programs that are sequences of program instructions compiled for execution within Fragment Processing Pipeline 260. Fragment Shader 255, within Fragment Processing Pipeline 160 generates codewords from shader program instructions. Furthermore, Fragment Shader 255, within Fragment Processing Pipeline 260, is optionally configured using shader programs such that data processing operations are performed in multiple passes within Fragment Shader 255. Data processed by Fragment Shader 255 is passed to Raster Analyzer 265, which optionally performs near and far plane clipping and raster operations, such as stencil, z test, and the like, and saves the results in graphics memory. Raster Analyzer 265 includes a read interface and a write interface to Memory Controller 220 through which Raster Analyzer 265 accesses data stored in Local Memory 240 or Host Memory 212.

When processing is completed, an Output 285 of Graphics Subsystem 207 is provided using Output Controller 280. Output Controller 280 is optionally configured to deliver data to a Display Device 295, network, electronic control system, other Computing System 200, other Graphics Subsystem 210, recording device, or the like.

Figure 2B:
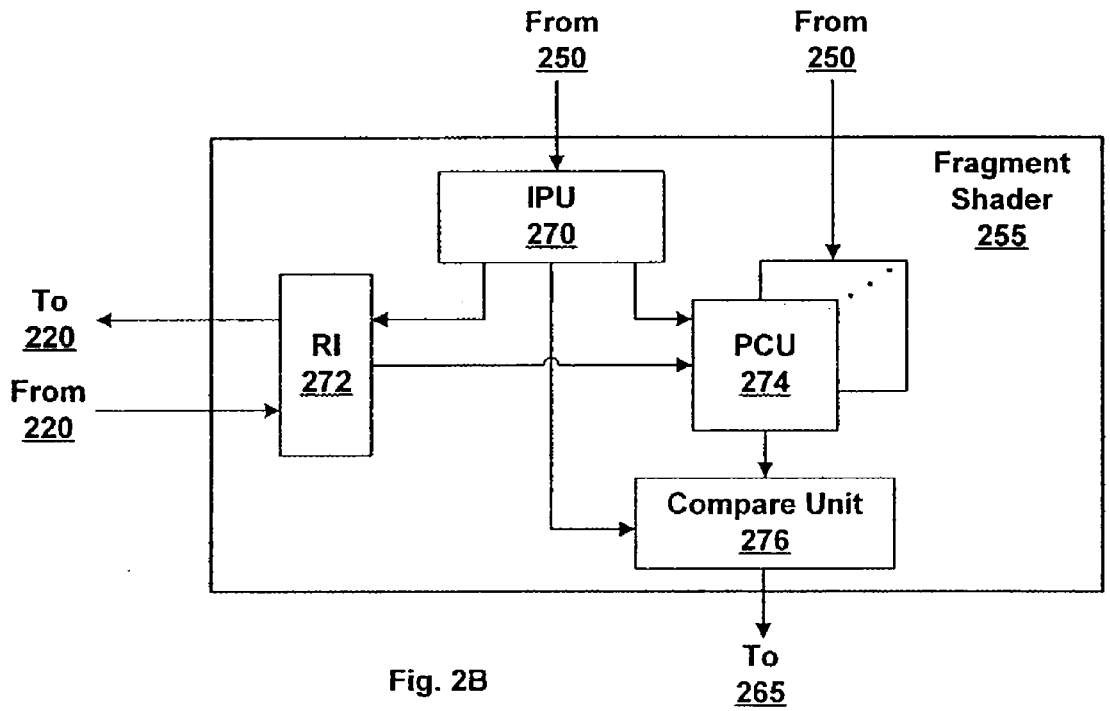
FIGS. 2B and 2C are block diagrams of an exemplary embodiment of a respective Fragment Shader in accordance with one or more aspects of the present invention.

FIG. 2B is a block diagram of an exemplary embodiment of Fragment Shader 255. An Instruction Processing Unit (IPU) 270 receives shader program instructions and generates codewords. IPU 270 outputs control signals to a Read Interface 272, at least one PCU 274 and a Compare Unit 276. Read Interface 272 generates address and control signals to Memory Controller 220 and receives data from fields of digital video data, i.e., video field data, stored in graphics memory, i.e., Local Memory 240 or Host Memory 212. Read Interface 272 outputs the video field data to PCU 274. PCU 274 is configured by the control signals to process data received from Read Interface 272 or data received from Rasterizer 250 and produce processed data, such as a measured difference between two samples or two fields of digital video data. The processed data is received by Compare Unit 276 and compared to a threshold value to generate a comparison result such as a field match result. The processed data and comparison result are output by Compare Unit 276 to Raster Analyzer 265. Alternatively, operations performed by Compare Unit 276 are performed by a PCU 274.

Figure 2C:
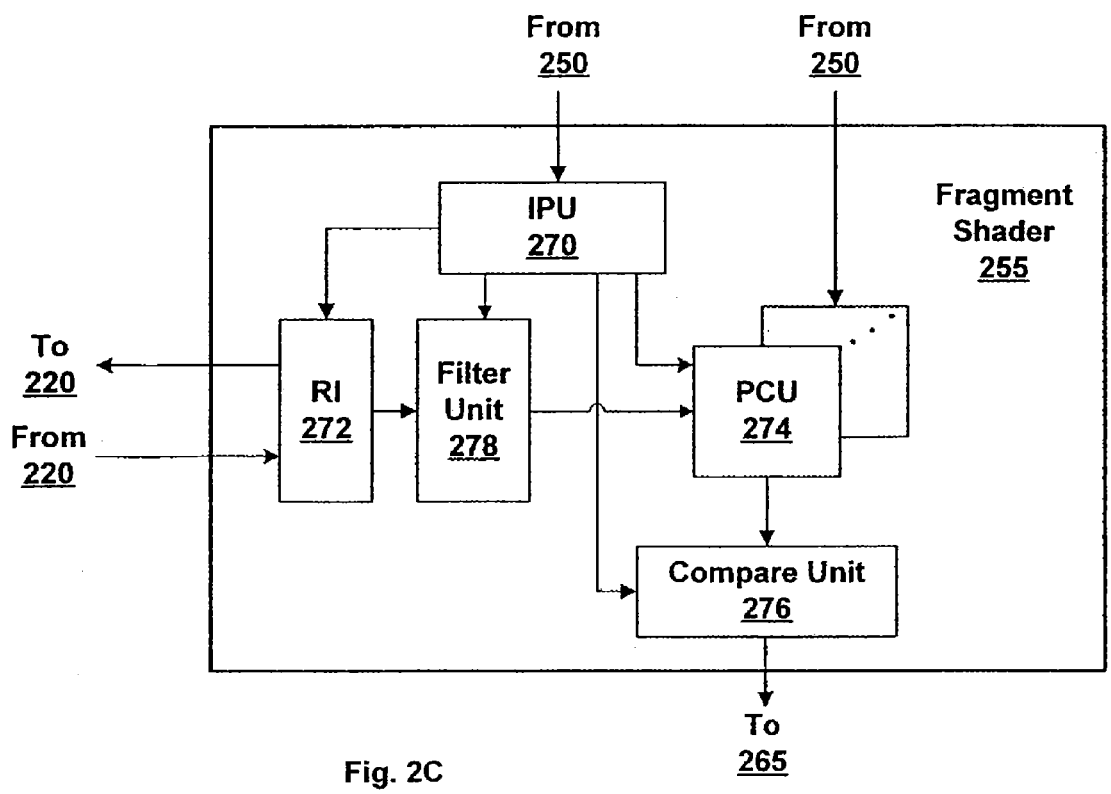

FIG. 2C is a block diagram of an exemplary embodiment of Fragment Shader 255 including the elements shown in FIG. 2B. IPU 270 outputs control signals to a Read Interface 272, Filter Unit 278 and at least one PCU 274. Read Interface 272 outputs the video field data to a Filter Unit 278. Filter Unit 278 filters the video field data using filtering operations and outputs filtered video field data to PCU 274. Examples of filtering operations include bilinear interpolation, computing a weighed sum, and the like. PCU 274 is configured by the control signals to process the filtered video field data received from Filter Unit 278 or data received from Rasterizer 250 and produce processed data. Alternatively, operations performed by Filter Unit 278 are performed by a PCU 274. The processed data is received by Compare Unit 276 and compared to a threshold value to generate a comparison result such as a field match result. The processed data and comparison result are output by Compare Unit 276 to Raster Analyzer 265.

FIGS. 3A, 3B, 3C and 3D are flow diagrams of exemplary embodiments of 3:2 pulldown detection in accordance with one or more aspects of the present invention. A shader program is used to configure Fragment Shader 255 to detect the presence 3:2 pulldown in a digital video data sequence, such as Portion of Pulldown Sequence 160. Read Interface 272 within Fragment Shader 255 is configured by shader program instructions to read pairs of fields of digital video data from graphics memory. The shader program instructions include indices used by Fragment Shader 255 to compute physical addresses in graphics memory where digital video data is stored. In step 301 Read Interface 272 receives a pair of fields of digital video data from graphics memory and each pair includes a first field of digital video data and a second, i.e. subsequent, field of digital video data that are separated within the digital video data sequence by a third field of digital video data. Specifically, the first field of digital video data is an (n−2)th video field in the digital video data sequence, the second field of digital video data is an nth video field in the digital video data sequence, and the third field of digital video data is an (n−1)th video field in the digital video data sequence. Examples of pairs of fields of digital video data in Portion of Pulldown Sequence 160 include Field 102 and subsequent duplicated Field 102, Field 103 and subsequent Field 113 or duplicated Field 102 and subsequent Field 112. With the exception of the first and last fields in a sequence of digital video fields, each field is included in two pairs of fields. In step 303 PCU 274 is configured by shader program instructions to measure a field difference between a field of digital video data and a subsequent field of digital video in a pair of fields. In step 304 Compare Unit 276 is configured by shader program instructions to compare the field difference to a field match threshold value to produce a field match result.

The field match result can be used to selectively output the sequence of digital video data without the duplicated fields, thereby removing the fields introduced during 3:2 pulldown. In FIG. 3B additional steps are included following the steps 301 and 303 shown in FIG. 3A. The additional steps are used for outputting the fields of digital video data. In step 305 Compare Unit 276 is configured by shader program instructions to compare the field difference to a field match threshold value, and, if the field difference does not exceed, i.e., is not greater than, the field match threshold value, in step 306 Programmable Graphics Processor 205 outputs one of the fields of digital video data and the subsequent field of digital video data. If in step 305 the field difference exceeds, i.e., is greater than, the field match threshold value, in step 306 Programmable Graphics Processor 205 outputs both the field of digital video data and the subsequent field of digital video data. Alternatively, Compare Unit 276 is configured by shader program instructions to compare the field difference to a field match threshold value, and, if the field match threshold value exceeds, i.e., is greater than, the field difference, Programmable Graphics Processor 205 outputs one of the field of digital video data and the subsequent field of digital video data. Furthermore, If the field match threshold value does not exceed, i.e., is not greater than, the field difference, Programmable Graphics Processor 205 outputs the field of digital video data and the subsequent field of digital video data.

Figure 3A:
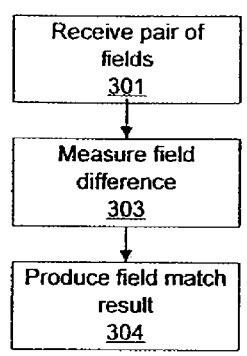
FIGS. 3A, 3B, 3C, 3D and 3E are flow diagrams of an exemplary embodiment of 3:2 pulldown detection in accordance with one or more aspects of the present invention.
Figure 3B:
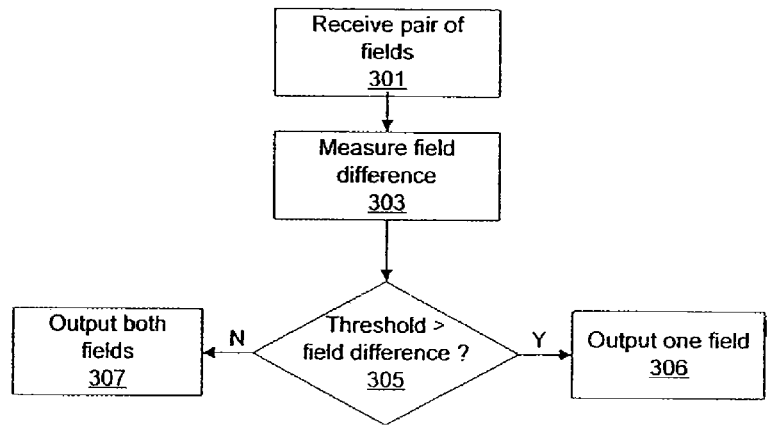
Figure 3C:
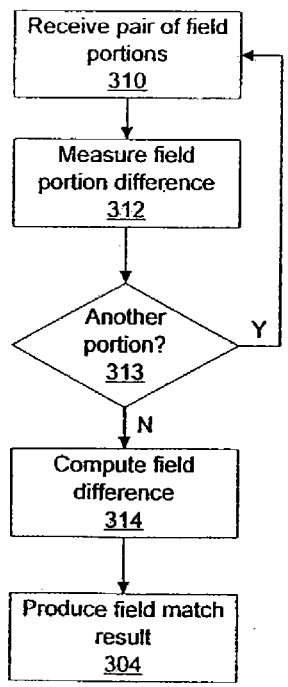

FIG. 3C, is a flow diagram of another method according to present invention that operates on portions of fields. In step 310 of FIG. 3C Read Interface 272 within Fragment Shader 255 receives portions of a pair of fields of digital video data such that each pair includes a portion of a field of digital video data and a corresponding portion of a subsequent field of digital video data. In step 312 PCU 274 is configured by shader program instructions to measure a field portion difference between the portion of the field of digital video data and the corresponding portion of the subsequent field of digital video data. In step 313 Fragment Shader 255 determines if there are more portions of the pair of fields of digital video data, and, if so, Fragment Shader 255 repeats steps 310, 312 and 313 to produce additional field portion differences. If in step 313 Fragment Shader 255 determines there are no more portions of the pair of fields of digital video data, in step 314 Fragment Shader 255 combines the field portion difference and the additional field portion differences to produce a field difference. In step 304 Compare Unit 276 is configured by shader program instructions to compare the field difference to a field match threshold value to produce a field match result.

Figure 3D:
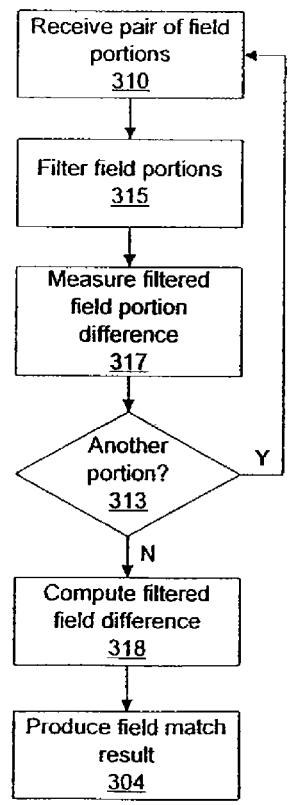

FIG. 3D includes the steps shown in FIG. 3C and adds steps including filtering operations. In step 310 Read Interface 272 within Fragment Shader 255 receives portions of a pair of fields of digital video data such that each pair includes a portion of a field of digital video data and a corresponding portion of a subsequent field of digital video data. In step 315 Filter Unit 278 performs at least one filtering operation on the portion of the field of digital video data to produce a filtered portion of the field of digital video data. In step 316 Filter Unit 278 performs at least one filtering operation on the corresponding portion of a subsequent field of digital video data and a filtered corresponding portion of a subsequent field of digital video data. In step 317 PCU 274 is configured by shader program instructions to measure a difference between the filtered portion of the field of digital video data and the filtered corresponding portion of the subsequent field of digital video data to produce a filtered field portion difference. Examples of filtering operations include bilinear interpolation, computing a weighed sum, and the like.

In step 313 Fragment Shader 255 determines if there are more portions of the pair of fields of digital video data, and, if so, Fragment Shader 255 repeats steps 310, 315, 316, 317 and 313 to produce additional filtered field portion differences. If in step 313 Fragment Shader 255 determines there are no more portions of the pair of fields of digital video data, in step 318 Fragment Shader 255 combines the filtered field portion difference and the additional filtered field portion differences to produce a field difference. In step 304 Compare Unit 276 is configured by shader program instructions to compare the field difference to a field match threshold value to produce a field match result.

Figure 3E:
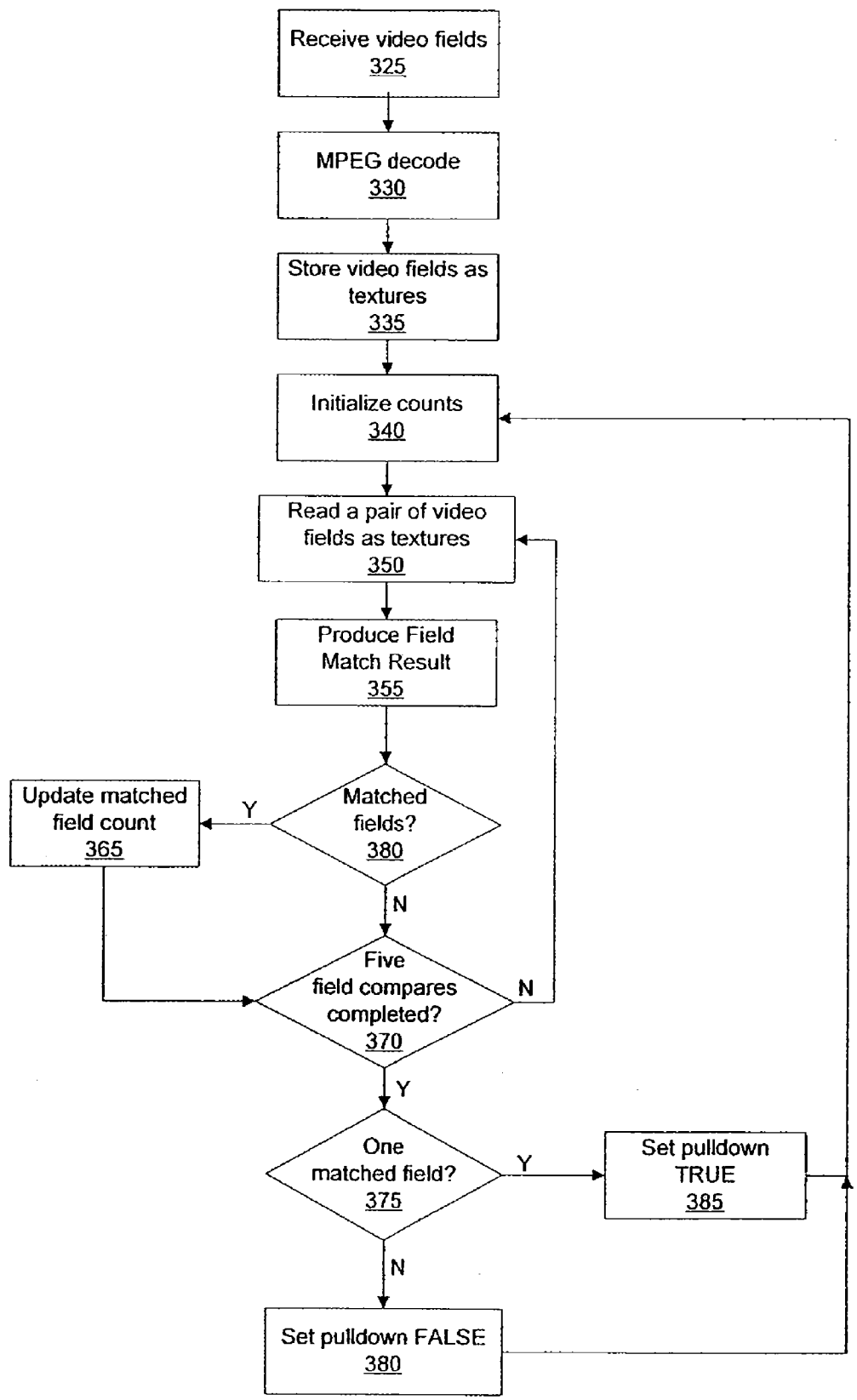

FIG. 3E is a flow diagram of an exemplary embodiment of 3:2 pulldown detection in accordance with one or more aspects of the present invention. In step 325 Video Unit 290 receives a stream of MPEG (moving pictures experts group) encoded video fields. In step 330 Video Unit 290 within Host Computer 210 decodes the stream of MPEG encoded video fields and outputs fields of digital video data to System Interface 215. In step 335 System Interface 215 stores the fields of digital video data as texture maps in Host Memory 212 or in Local Memory 240 via Interface 217 and Memory Controller 220. Alternatively, in step 330 Video Unit 290 within Programmable Graphics Processor 205 decodes the stream of MPEG encoded video fields and outputs fields of digital video data to Memory Controller 220 and in step 335 Memory Controller 220 stores the fields of digital video data in Local Memory 240. In step 340 a field compare count and a matched field count in Fragment Shader 255 are each initialized to a value of zero. In an alternative embodiment, the field compare count is initialized to a value of five and a non-matched field count is initialized to a value of zero. In step 350 Fragment Shader 255 reads a pair of fields of video data as texture maps. The pair of fields of video data are alternating fields in a sequence, such as Field 103 and Field 113 or Field 102 and duplicated Field 102 shown in FIG. 1.

In step 355 Fragment Shader 255 compares the pair of fields of video data and generates a field match result as described further herein. In step 355 Fragment Shader 255 also updates the field compare count by incrementing the field compare count. In the alternative embodiment, the field compare count is decremented. In step 360 Fragment Shader 255 uses the field match result to determine if the pair of fields of video data match, and, if so, in step 365 the matched field count is updated by incrementing the matched field count. In the alternative embodiment, the non-matched field count is updated by incrementing the non-matched field count. If in step 360 Fragment Shader 255 determines the pair of fields of video data do not match Fragment Shader 255 proceeds to step 370. In step 370 Fragment Shader 255 determines if five field comparisons have been completed, e.g., the value of the field compare count is equal to five, and, if not, Fragment Shader 255 repeats steps 350, 355, 360 and 370 and optionally repeats step 365 until Fragment Shader 255 determines that five field comparisons have been completed in step 370. In the alternative embodiment, in step 370 Fragment Shader 255 determines that five field comparisons have been completed when the value of the field compare count is equal to zero.

For example, a sequence of field match results generated in step 355 during processing of Portion of Pulldown Sequence 160 shown in FIG. 1 is equal for the comparison of Field 102 and duplicated Field 102, not equal for a comparison of Field 103 and Field 113, not equal for a comparison of duplicated Field 102 and Field 112, not equal for a comparison of Field 113 and Field 123 and not equal for a comparison of Field 112 and Field 122. For every five successive field comparisons of the fields in Portion of Pulldown Sequence 160 there is one matched field due to the use of pulldown to generate Portion of Pulldown Sequence 160 from Portion of Film Sequence 150.

Continuing in step 370, if Fragment Shader 255 determines that five field comparisons have been completed, in step 375 Fragment Shader 255 determines if there is one matched field count, e.g. the matched field count is equal to one. In the alternative embodiment Fragment Shader 255 determines there is one matched field count when the non-matched field count is equal to four. If in step 375 Fragment Shader 255 determines there is one matched field count, in step 385 Fragment Shader 255 determines a pulldown result, e.g., sets a pulldown flag to a true state, and returns to step 340. If in step 375 Fragment Shader 255 determines there is not one matched field count, in step 380 Fragment Shader 255 determines a pulldown result, e.g., sets the pulldown flag to a false state, and returns to step 340. The pulldown flag can be used by Fragment Shader 255 to disable display of duplicated fields, effectively removing the duplicated fields. The pulldown flag can also be used by Display Device 295 to control a display mode. When the pulldown flag is set to the true state video fields, excluding any disabled video fields, originating from film content are displayed using a non-interlaced display mode. Conversely, when the pulldown flag is set to the false state video fields originating from video content, i.e., without 3:2 pulldown, are displayed using an interlaced display mode.

Figure 4A:
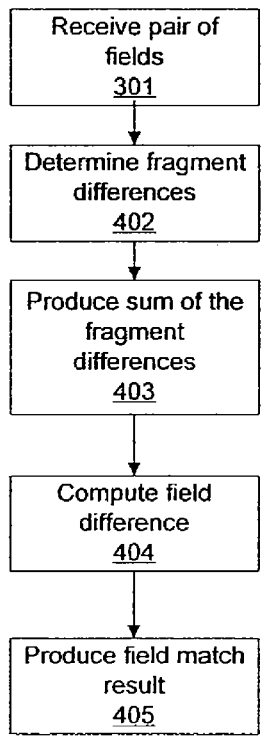
FIGS. 4A, 4B and 4C are flow diagrams of exemplary embodiments of field difference determination in accordance with one or more aspects of the present invention.

FIG. 4A is a flow diagram of an exemplary embodiment of step 303 and step 304 of FIG. 3A in accordance with one or more aspects of the present invention. The field match threshold value is used to determine field equivalence. The mean absolute value of differences between each pair of fields of video data is computed to produce a field difference and the fields of video data are considered equivalent when the field difference is less than the field match threshold value. In step 301 Read Interface 272 within Fragment Shader 255 receives a pair of fields of digital video data, including a field of digital video data and a subsequent field of digital video data. In step 402 Fragment Shader 255 determines fragment differences between each fragment in the field of digital video data and each fragment in the subsequent field of digital video. In one embodiment a difference is computed for each component, e.g., red (R), green (G) and blue (B), of a fragment to produce component differences. The component differences are summed produce a fragment difference. In step 403 Fragment Shader 255 accumulates the fragment differences to produce a sum of differences. In step 404 Fragment Shader 255 computes a mean of the sum of differences to produce a field difference. In step 405 Fragment Shader 255 compares the field difference to a field match threshold value to produce a field match result.

Figure 4B:
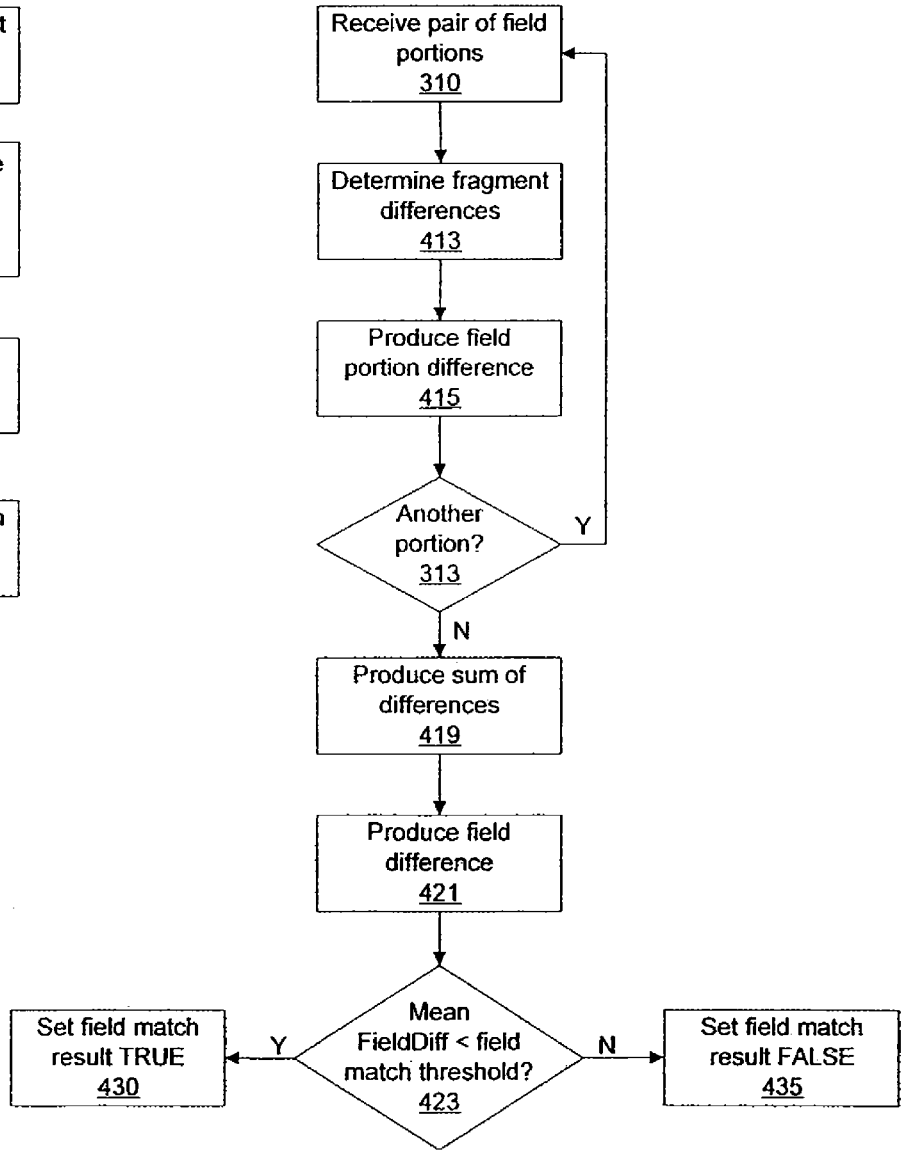

FIG. 4B is a flow diagram of an exemplary embodiment of step 312 and step 314 of FIG. 3C in accordance with one or more aspects of the present invention. In step 310 Read Interface 272 within Fragment Shader 255 receives portions of a pair of fields of digital video data, including a portion of a field of digital video data and a corresponding portion of a subsequent field of digital video data. In step 413 at least one PCU 274 is configured by shader program instructions to determine differences between fragments in the portion of the field of digital video data and corresponding fragments in the portion of the subsequent field of digital video data to produce fragment differences. In step 415 at least one PCU 274 is configured by shader program instructions to accumulate the fragment differences to produce a field portion difference. In step 313 Fragment Shader 255 determines if there are more portions of the pair of fields of digital video data, and, if so, Fragment Shader 255 repeats steps 310, 413, 415 and 313 to produce additional field portion differences. If in step 313 Fragment Shader 255 determines there are no more portions of the pair of fields of digital video data, in step 419 at least one PCU 274 is configured by shader program instructions to combine the field portion difference and the additional field portion differences to produce a sum of differences. In step 421 at least one PCU 274 is configured by shader program instructions to compute a mean of the sum of differences to produce a field difference ("FieldDiff"). In step 423 Compare Unit 276 is configured by shader program instructions to compare the field difference to a field match threshold value and if Compare Unit 276 determines FieldDiff is less than the field match threshold value, in step 430 Fragment Shader 255 sets a field match result to a true state. If in step 423 Compare Unit 276 determines FieldDiff is not less than the field match threshold value, in step 425 Fragment Shader 255 sets the field match result to a false state.

Figure 4C:
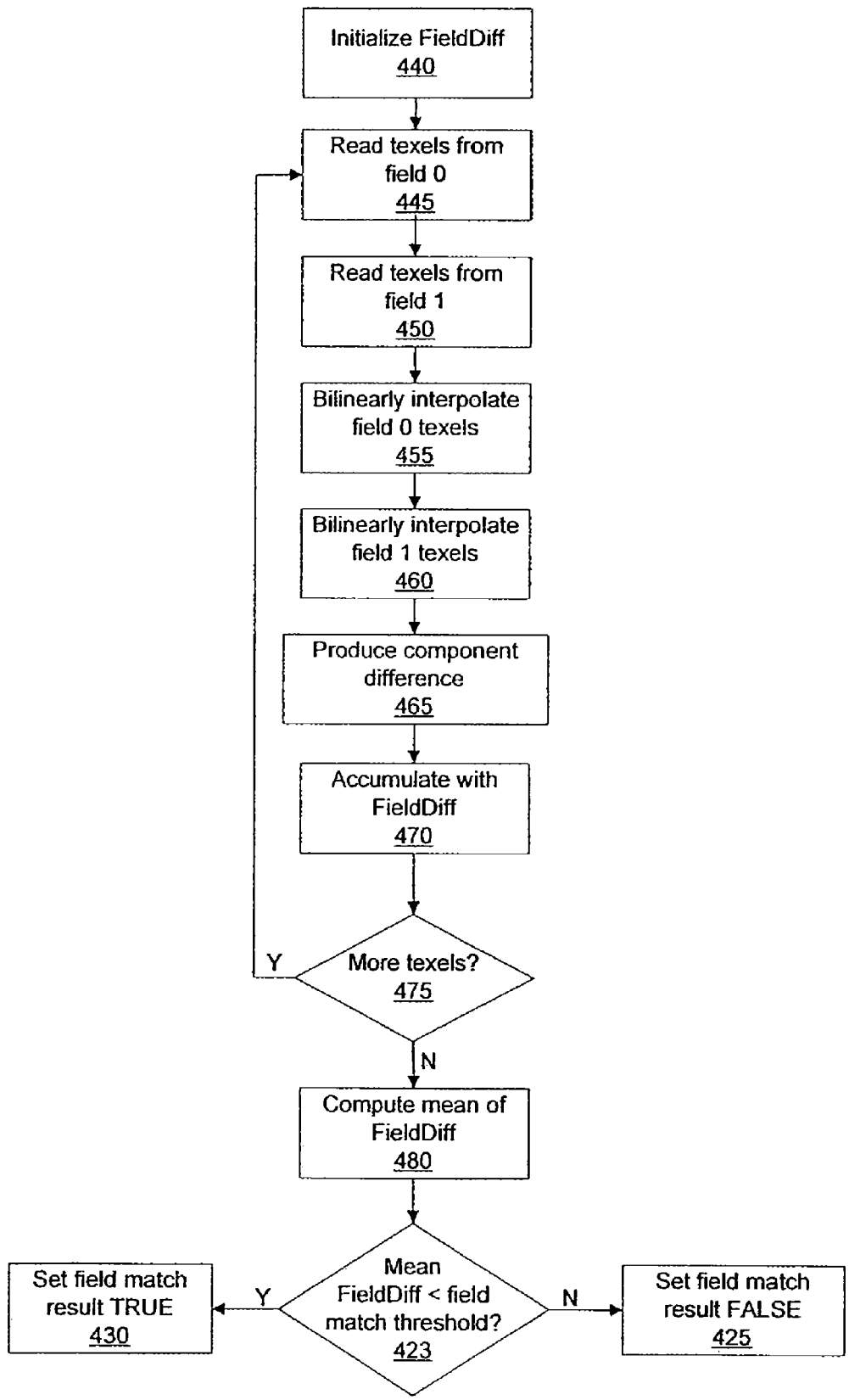

FIG. 4C is a flow diagram of an exemplary embodiment of step 350 and step 355 of FIG. 3E including reading fragments in each field of digital video data as texels and filtering the texels prior to producing the field difference in accordance with one or more aspects of the present invention. In step 440 Fragment Shader 255 initializes a FieldDiff value stored in Fragment Shader 255 to a value of zero. In step 445 Fragment Shader 255 reads four neighboring texels arranged in a square from field 0, where field 0 is stored as a texture map in graphics memory. In step 450 Fragment Shader 255 reads four neighboring texels arranged in a square from field 1, where field 1 is stored as a texture map in graphics memory. Field 0 and field 1 compose a pair of video fields. Field 0 and field 1 stored as texture maps include color data represented as RGB, YUV, YIQ, YCrCb, and the like. The Y component in YUV, YIQ and YCrCb representations is luminance and U, V, I, Q, Cr and Cb are chrominance components. R, G and B components are a combination of luminance and chrominance.

In step 455 Fragment Shader 255 bilinearly interpolates each component, e.g., Y, U, and V, of the four neighboring texels read from field 0 to generate an interpolated texel from field 0. In step 460 Fragment Shader 255 bilinearly interpolates each component of the four neighboring texels read from field 1 to generate an interpolated texel from field 1. Bilinearly interpolating the texels within each field reduces the texel data by a factor of four and utilizes at least one PCU 274 or Filter Unit 278 that would otherwise be idle. Consequently, the number of absolute differences input to the mean absolute difference computation for each pair of fields is also reduced by a factor of four.

In step 465 Fragment Shader 255 computes an absolute value of a difference between each component of the interpolated texel from field 0 and each component of the interpolated texel from field 1 to generate an interpolated texel difference for each component. In step 470 Fragment Shader 255 accumulates the interpolated texel difference for each component with the FieldDiff. In step 475, Fragment Shader 255 determines if there are texels in field 1 or field 0 that have not been read and bilinearly interpolated, and, if so, steps 445, 450, 455, 460, 465 470 and 475 are repeated. If in step 475 Fragment Shader 255 determines that all of the texels in field 1 and field 0 have been read and bilinearly interpolated, in step 480 Fragment Shader 255 computes a mean of the FieldDiff.

In step 423 Fragment Shader 255 determines if FieldDiff is less than a field match threshold value, to be further described herein. In an alternative embodiment Fragment Shader 255 determines the field match threshold value is not less than than FieldDiff. If in step 423 Fragment Shader 255 determines FieldDiff is less than the field match threshold value, in step 430 Fragment Shader 255 sets a field match result to a true state. If in step 423 Fragment Shader 255 determines FieldDiff is not less than the field match threshold value, in step 425 Fragment Shader 255 sets the field match result to a false state. The field match result is used by Fragment Shader 255 in step 355 of FIG. 3E.

The field match threshold value can have a default value and the field match threshold value can be modified by writing a new value to a field match threshold register in Programmable Graphics Processor 205 that is readable by Fragment Shader 255. In an alternative embodiment the field match threshold value can be selected from a fixed set of values using a program instruction or register write. Additionally, a distribution of the FieldDiff values for a plurality of field comparisons can be collected and fuzzy logic can be used to dynamically tune the field match threshold value based on the distribution.

Figure 5:
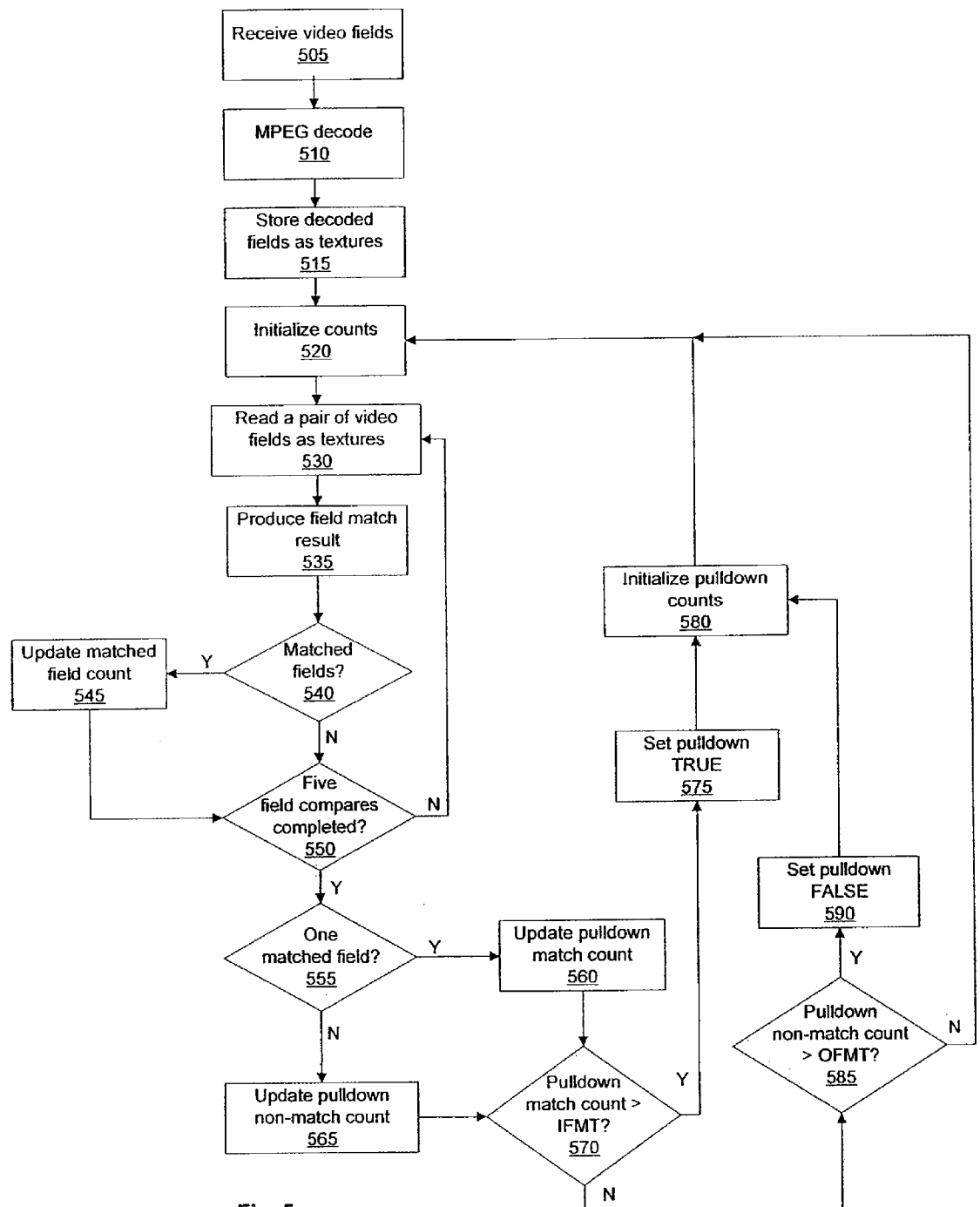
FIG. 5 is a flow diagram of an exemplary embodiment of using field equivalence information to switch into or out of film mode in accordance with one or more aspects of the present invention.

FIG. 5 is a flow diagram of an exemplary embodiment of setting the pulldown flag to control when to switch into or out of film mode in accordance with one or more aspects of the present invention. In film mode duplicated fields introduced into film content during 3:2 pulldown are removed and remaining fields of digital video data are displayed non-interlaced. In non-film mode, i.e., video mode, digital video fields are displayed interlaced. When the fields of digital video data in a sequence change from film content to video content it is desirable to quickly switch out of film mode and into video mode to reduce the occurrence of visual artifacts caused by displaying video content non-interlaced. Similarly, when the fields of digital video data in a sequence change from video content to film content it is desirable to switch into film mode from video mode without displaying video content non-interlaced.

When to switch into film mode can be determined by counting the number of times pulldown is detected for a sequence of fields of digital video data. Likewise, when to switch into film mode can be determined by counting the number of times pulldown is not detected for a sequence of fields of digital video data. For each sequence of five digital video field pair comparisons, the number of times pulldown is detected is counted and the number of times pulldown is not detected is counted to generate a pulldown match count and a pulldown non-match count respectively. The pulldown match count is compared to a matched field count threshold value, IFMT (into film mode threshold value) to control a transition into film mode and the pulldown non-match count is compared to a non-matched field count threshold value, OFMT (out of film mode threshold value) to control a transition out of film mode.

In step 505 Video Unit 290 receives a stream of MPEG encoded digital video fields. In step 510 Video Unit 290 decodes the stream of MPEG encoded digital video fields and outputs a sequence of digital video fields containing fields of digital video data. In step 515 System Interface 215 stores the fields of digital video data as texture maps in Host Memory 212 or in Local Memory 240 via Interface 217 and Memory Controller 220. In step 520 the field compare count and the matched field count in Fragment Shader 255 are each initialized to a value of zero. In step 530 Fragment Shader 255 reads a pair of fields of digital video data as texture maps.

In step 535 Fragment Shader 255 compares the pair of fields of digital video data and produces the field match result. In step 535 Fragment Shader 255 also updates the field compare count by incrementing the field compare count. In step 540 Fragment Shader 255 uses the field match result to determine if the pair of fields of digital video data match, and, if so, in step 545 the matched field count is updated by incrementing the matched field count. If in step 540 Fragment Shader 255 determines the pair of fields of digital video data do not match Fragment Shader 255 proceeds to step 550. In step 550 Fragment Shader 255 determines if the value of the field compare count is equal to five, and, if not, Fragment Shader 255 repeats steps 530, 535, 540 and 550 and optionally repeats step 545 until the field compare count is equal to five in step 550.

In step 550 if Fragment Shader 255 determines five field comparisons have been completed, in step 555 Fragment Shader 255 determines if there is one matched field. If in step 555 Fragment Shader 255 determines there is one matched field, in step 560 Fragment Shader 255 updates the pulldown match count by incrementing the pulldown match count and procedes to step 570. If in step 555 Fragment Shader 255 determines there is not one matched field, in step 565 Fragment Shader 255 updates the pulldown non-match count by incrementing the pulldown non-match count and proceeds to step 570. In step 570 Fragment Shader 255 determines if the pulldown match count is greater than the IFMT, and, if so, in step 575 Fragment Shader 255 sets the pulldown flag to a true state and proceeds to step 580. If in step 570 Fragment Shader 255 determines the matched field count is not greater than the IFMT, in step 585 Fragment Shader determines if the pulldown non-match count is greater than the OFMT, and, if not, returns to step 520. If in step 585 Fragment Shader determines the pulldown non-match count is greater than the OFMT, in step 590 Fragment Shader 255 sets a pulldown flag to a false state and proceeds to step 580. In step 580 Fragment Shader 255 initializes the pulldown match count and the pulldown non-match count to zero and returns to step 520 and the process continues.

The pulldown flag and the field match result can be used by Programmable Graphics Processor 205 to control switching into film mode by selecting which fields within the sequence of digital video fields to output or display, i.e., marking duplicated fields such that they are not output or displayed. Digital video fields that are not output or displayed are effectively discarded. Likewise, the pulldown flag can also be used by Programmable Graphics Processor 205 to control switching out of film mode by selecting all fields within the sequence of digital video fields for output or display.

Figure 6:
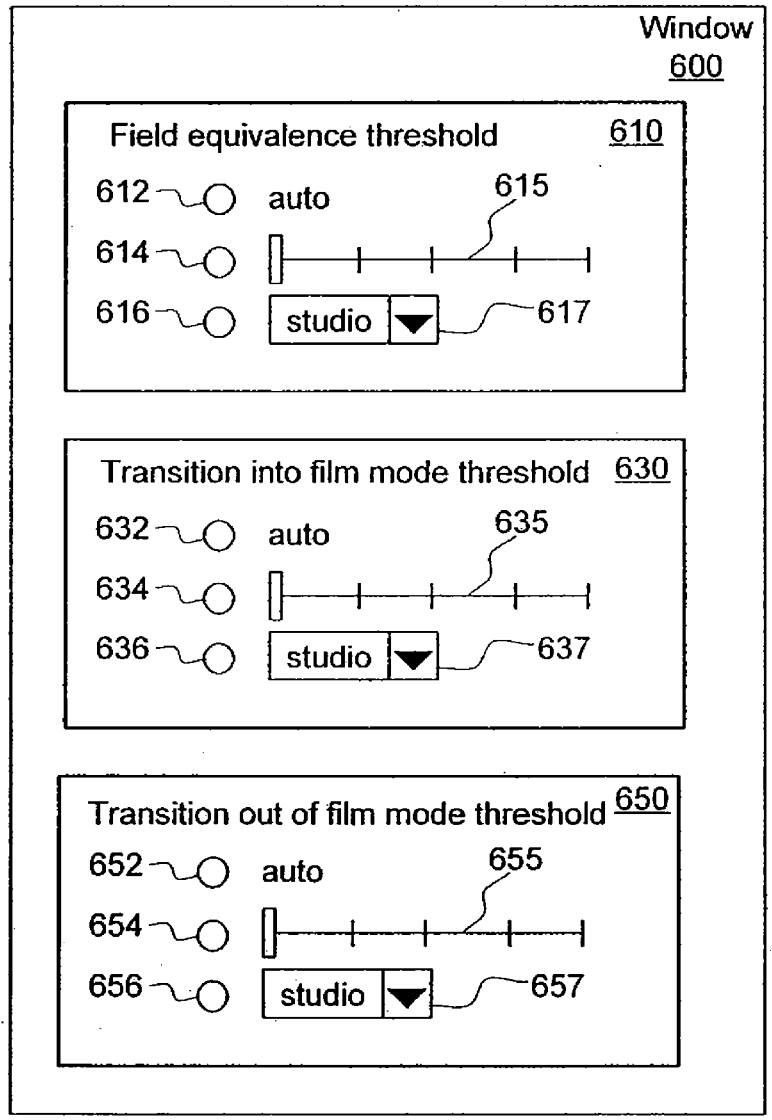
FIG. 6 is an exemplary graphical user interface in accordance with one or more aspects of the present invention.

FIG. 6 is an exemplary graphical user interface in accordance with one or more aspects of the present invention. The user interface permits a user to set values for the field match threshold value, IFMT, and OFMT. A Window 600 is displayed on the screen desktop of Display Device 295. Window 600 includes a Graphical User Interface 610, a Graphical User Interface 630 and a Graphical User Interface 650.

Graphical User Interface 610 includes options for setting the field match threshold value. A user may select one option by selecting a radio button 612, a radio button 614 or a radio button 616 and the selection is communicated to Fragment Shader 255 as described further herein. Selecting radio button 612 enables Fragment Shader 255 to dynamically tune the field match threshold value based on a distribution of the FieldDiff values for a plurality of field comparisons. In an alternative embodiment Selecting radio button 612 enables Fragment Shader 255 to detect 3:2 pulldown according to a user defined algorithm included in a shader program. Selecting radio button 614 enables the user to specify the field match threshold value using a slider bar 615 to select a match percent ranging from zero to one hundred percent match. In an alternative embodiment the user selects the match percent by entering a value into a data entry field. The match percent is converted into the field match threshold value. Selecting radio button 616 allows the user the select the field match threshold value encoded for a studio or other content provider using a drop-down menu 617. In an alternative embodiment, the user selects the field match threshold value encoded for a studio or other content provider using a button.

Graphical User Interface 630 includes options for setting the IFMT. The user may select one option by selecting a radio button 632, a radio button 634 or a radio button 636. Selecting radio button 632 enables Fragment Shader 255 to dynamically tune the IFMT based on a distribution of the pulldown match counts and pulldown non-match counts for a plurality of field comparisons. Selecting radio button 614 enables the user to specify the IFMT using a slider bar 635 to select the IFMT ranging from one to ten or even higher. Selecting radio button 636 allows the user the select the IFMT value encoded for a studio or other content provider using a drop-down menu 637.

Graphical User Interface 650 includes options for setting the OFMT. The user may select one option by selecting a radio button 652, a radio button 654 or a radio button 656. Selecting radio button 652 enables Fragment Shader 255 to dynamically tune the OFMT based on a distribution of pulldown match counts and pulldown non-match counts for a plurality of field comparisons. Selecting radio button 654 enables the user to specify the OFMT using a slider bar 655 to select the OFMT ranging from one to ten or even higher. Selecting radio button 656 allows the user the select the OFMT value encoded for a studio or other content provider using a drop-down menu 657.

An application programming interface (API) can be used by an application to specify the values for the field match threshold value, IPHM or OFMT. For example, the API can be used to communicate selections entered by the user of Graphical User Interface 600 to Fragment Shader 255. The API is executed by Host Processor 214 and includes a function call that is used to write at least one register in Programmable Graphics Processor 205 that is readable by Fragment Shader 255. For example, the OFMT value corresponding to the studio selection entered by the user of Graphical User Interface 600 is written to an OFMT register in Fragment Shader 255 using the function call. The function call includes the register address and the value to be stored in the register.

A device driver executed by Host Processor 214 detects that Programmable Fragment Shader 255 supports the field match threshold value, IPHM or OFMT and communicates that information to the API. A graphics application executed by Host Processor 214 can issue the function call to specify values stored in the at least one register that is readable by Fragment Shader 255.

Figure 7:
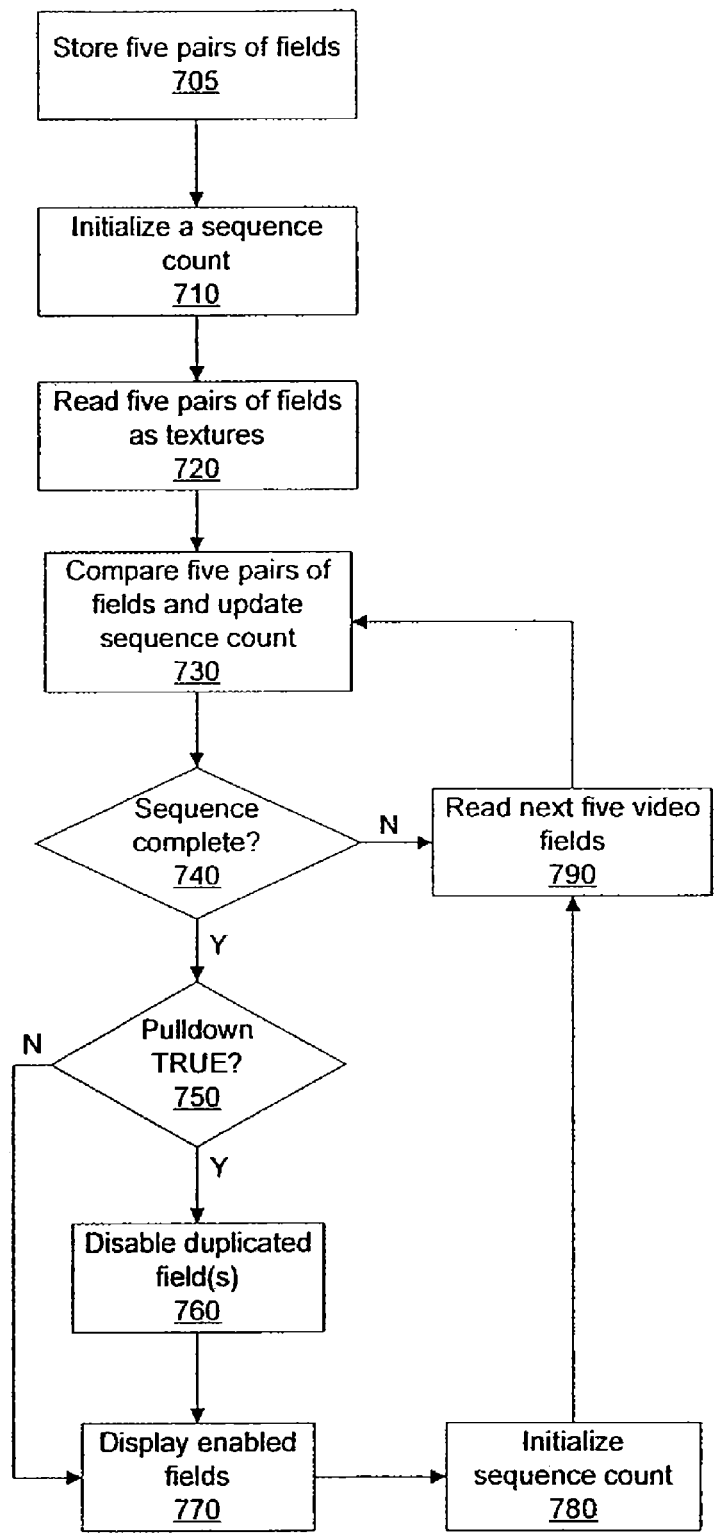
FIG. 7 is a flow diagram of an exemplary embodiment of using early detection of 3:2 pulldown to selectively discard video fields in accordance with one or more aspects of the present invention.

FIG. 7 a flow diagram of an exemplary embodiment of using early detection of 3:2 pulldown to selectively discard video fields in accordance with one or more aspects of the present invention. Using a look ahead technique to determine when to switch into film mode during 3:2 pulldown detection. It is possible to detect the presence of 3:2 pulldown and only display the non-duplicated fields by looking ahead by seven video fields, resulting in a higher quality viewing experience. Without look ahead the duplicated fields will be displayed for at least the first seven fields. Consequently the transition into film mode when pulldown is detected occurs earlier than without the use of look ahead. Conversely, the transition out of film mode when pulldown is not detected occurs earlier than without the use of look ahead. The occurrence of visual artifacts, e.g., combing, feathering, and the like, caused by displaying video content non-interlaced will be minimized.

In step 705 five pairs of fields of digital video data are stored in Local Memory 240 as texture maps. In step 710 a sequence count is initialized. The sequence count can be set to IFMT when Pulldown is false and set to OFMT when Pulldown is true. Alternatively, the sequence count can be set to an independent value using a register write instruction. In step 720 Fragment Shader 255 reads the five pairs of fields of digital video data stored as texture maps. For example, referring to Portion of Pulldown Sequence 160 in FIG. 1, Frames 102, 103, 102 (duplicated), 113, 112, 123 and 122 are read by Fragment Shader 255. In step 730 Fragment Shader 255 compares the five pairs of video fields as described in FIG. 3 or FIG. 5 and updates, e.g., decrements, the sequence count. For example, referring again to Portion of Pulldown Sequence 160 in FIG. 1, Frames 102 and 102 (duplicated) are compared, Frames 103 and 113 are compared, Frames 102 (duplicated) and 112 are compared, Frames 113 and 123 are compared and Frames 112 and 122 are compared. The field match result for each comparison is used to generate duplicated field information. The duplicated field information is saved as state information stored in Fragment Shader 255 or in graphics memory.

In step 740 Fragment Shader 255 determines if the sequence has been completed, e.g., the sequence count is equal to zero, and, if so, Fragment Shader 255 determines if the pulldown flag is set to a true state. If in step 740 Fragment Shader 255 determines if the sequence has been completed, e.g., the sequence count is not equal to zero, Fragment Shader 255 proceeds to step 790.

If in step 750 Fragment Shader 255 determines the pulldown flag is set to a true state, in step 760 Fragment Shader 255 uses the duplicated field information and updates field display state information to disable any fields that are duplicates. If in step 750 Fragment Shader 255 determines the pulldown flag is not set to a true state, i.e., the pulldown flag is set to a false state, Fragment Shader 255 proceeds to step 770. In step 770 the field display state information is passed from Fragment Shader 255 to Output Controller 280 via Raster Analyzer 265 and Memory Controller 220 and enabled fields are output for display by Output Controller 280. In step 780 Fragment Shader 255 initializes the sequence count and in step 790 Fragment Shader 255 reads the next five video fields, for example, beginning with duplicated Field 123. The last two of the previously read video fields, e.g., Fields 123 and Field 122 in Portion of Pulldown Sequence 160 in FIG. 1, are also available in Fragment Shader 255 to provide five pairs of video fields for step 730. In an alternative embodiment the last two of the previously read video fields are read by Fragment Shader 255 in step 790. In one embodiment, the sequence count is decremented in step 730 and the display of the first video field occurs after the sequence count is decremented to a value of zero. Therefore the higher the value that the sequence count is initialized to, the longer the time will be from Programmable Graphics Processor 205 receiving a first video field until the first video field is displayed.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.

The invention claimed is:

1. A computer implemented method for detecting 3:2 pulldown in a digital video sequence, comprising:
    measuring differences between an odd field and an even field within each of five sequential pairs of fields of digital video data stored in a graphics memory to produce five field differences;
    comparing each of the five field differences to a field match threshold value to produce a matched field count and a field compare count;
    indicating 3:2 pulldown is detected when the field compare count is five and the matched field count is one; and
    indicating 3:2 pulldown is not detected when the field compare count is five and the matched field count is not one,
    wherein the steps of measuring and comparing are performed by a fragment shader in a graphics processing unit that executes shader program instructions.

2. The method of claim 1, wherein the matched field count threshold value is adjustable.

3. The method of claim 1, wherein the matched field count threshold value is dynamically tuned.

4. The method of claim 1, further comprising selectively discarding one of the fields of digital video data when 3:2 pulldown is detected.

5. The method of claim 1, further comprising selectively outputting the fields of digital video data when 3:2 pulldown is not detected.

6. The method of claim 1, wherein the five sequential pairs of fields of digital video data are stored in the graphics memory as texture maps.

7. The method of claim 1, further comprising reading the five sequential pairs of field of digital video data stored in the graphics memory as texture maps.

8. A programmable graphics processor configured to detect 3:2 pulldown in a sequence of digital video fields comprising:
    a read interface configured to read the sequence of digital fields from a graphics memory; and
    a fragment shader configured to detect 3:2 pulldown in the sequence of digital video fields by executing shader program instructions, wherein the fragment shader includes:
        at least one programmable computation unit configured to measure differences between an odd field and an even field within each of five sequential pairs of fields of digital video data to produce five field differences; and
        a compare unit configured to compare each of the five field differences to a field match threshold value to produce a matched field count and a field compare count, wherein the fragment shader is configured to:
        indicate 3:2 pulldown is detected when the field compare count is five and the matched field count is one; and
        indicate 3:2 pulldown is not detected when the field compare count is five and the matched field count is not one.

9. The programmable graphics processor of claim 8, wherein the matched field count threshold value is adjustable.

10. The programmable graphics processor of claim 8, wherein the matched field count threshold value is dynamically tuned.

11. The programmable graphics processor of claim 8, wherein the fragment shader is further configured to selectively discard one of the fields of digital video data when 3:2 pulldown is detected.

12. The programmable graphics processor of claim 8, wherein the fragment shader is further configured to selectively output the fields of digital video data when 3:2 pulldown is not detected.

13. The programmable graphics processor of claim 8, wherein the five sequential pairs of fields of digital video data are stored in the graphics memory as texture maps.

14. The programmable graphics processor of claim 8, wherein the fragments shader is further configured to read the five sequential pairs of field of digital video data stored in the graphics memory as texture maps.

* * * * *